(12) United States Patent
Watanabe

(10) Patent No.: US 8,818,371 B2
(45) Date of Patent: Aug. 26, 2014

(54) WIRELESS COMMUNICATION SYSTEM, NEIGHBOR CELL LIST OPTIMIZING SYSTEM, BASE STATION, NEIGHBOR CELL LIST UPDATING METHOD, AND PROGRAM

(75) Inventor: Yoshinori Watanabe, Minato-ku (JP)

(73) Assignee: NEC Corporation, Tokyo (JP)

( * ) Notice: Subject to any disclaimer, the term of this patent is extended or adjusted under 35 U.S.C. 154(b) by 10 days.

(21) Appl. No.: 13/699,395

(22) PCT Filed: Jun. 15, 2011

(86) PCT No.: PCT/JP2011/003408
§ 371 (c)(1),
(2), (4) Date: Nov. 21, 2012

(87) PCT Pub. No.: WO2011/158501
PCT Pub. Date: Dec. 22, 2011

(65) Prior Publication Data
US 2013/0079005 A1    Mar. 28, 2013

(30) Foreign Application Priority Data

Jun. 16, 2010  (JP) ................................. 2010-137281

(51) Int. Cl.
*H04W 4/00* (2009.01)
*H04W 36/00* (2009.01)

(52) U.S. Cl.
USPC ..................... 455/435.3; 455/435.1; 455/436; 370/331

(58) Field of Classification Search
USPC ..................... 455/435.1, 435.3, 436; 370/331
See application file for complete search history.

(56) References Cited

U.S. PATENT DOCUMENTS

2007/0249344 A1    10/2007    Hosono et al.
2008/0002628 A1    1/2008    Bi et al.
2009/0047961 A1 *   2/2009    Kim .............................. 455/436
2009/0061871 A1 *   3/2009    Gross et al. .................. 455/436

FOREIGN PATENT DOCUMENTS

| JP | 3466499 B2 | 11/2003 |
| JP | 2007-295123 A | 11/2007 |
| JP | 2008-236727 A | 10/2008 |
| JP | 2008-288812 A | 11/2008 |
| JP | 2009-542104 A | 11/2009 |

OTHER PUBLICATIONS

David Soldani et al., "Self-Optimizing Neighbor Cell List for UTRA FDD Networks Using Detected Set Reporting", IEEE VTC 2007, pp. 694-698.
3GPP TS 36.331, 3rd Generation Partnership Project; Technical Specification Group Radio Access Network; Evolved Universal Terrestrial Radio Access (E-UTRA) Radio Resource Control (RRC); Protocol Specification (Release 8), 2008, pp. 66, Dec. 2008.
International Search Report for PCT/JP2011/003408 dated Sep. 20, 2011.

* cited by examiner

*Primary Examiner* — Omoniyi Obayanju
(74) *Attorney, Agent, or Firm* — Sughrue Mion, PLLC

(57) ABSTRACT

A first mobile terminal group has a first measurement information transmitting means which measures radio quality of a second cell, and transmits measurement information to a first base station, a second mobile terminal group has a second measurement information transmitting means which measures radio quality of a first cell, and transmits measurement information to a second base station, and a neighbor cell list optimizing system has: a measurement information collecting means which collects the measurement information of the first and second cells; a reliability evaluating means which performs processing of evaluating reliability of the measurement information of the second cell; a priority calculating means which, when the reliability is a predetermined threshold or less, calculates a priority for registering the second cell in the neighbor cell list of the first cell based on the measurement information of the first cell; and a neighbor cell list updating means which performs control of determining a neighbor cell to be registered based on the priority, and updating the neighbor cell list.

8 Claims, 9 Drawing Sheets

FIG. 3

COUNT OF MEASUREMENT OF
TERMINALS IN CELL X
111

| NEIGHBOR CELL | NUMBER OF REPORTS | PRIORITY |
|---|---|---|
| #1 | $n_{X1}$ | $R_{X1}$ |
| #2 | $n_{X2}$ | $R_{X2}$ |
| #3 | $n_{X3}$ | $R_{X3}$ |
| ... | ... | ... |
| #M | $n_{XM}$ | $R_{XM}$ |

COUNT OF MEASUREMENT OF
TERMINALS IN NEIGHBOR CELL Y
112

| NEIGHBOR CELL | NUMBER OF REPORTS | PRIORITY |
|---|---|---|
| #1 | $n_{1X}$ | $R_{1X}$ |
| #2 | $n_{2X}$ | $R_{2X}$ |
| #3 | $n_{3X}$ | $R_{3X}$ |
| ... | ... | ... |
| #M | $n_{MX}$ | $R_{MX}$ |

WIRELESS COMMUNICATION SYSTEM, NEIGHBOR CELL LIST OPTIMIZING SYSTEM, BASE STATION, NEIGHBOR CELL LIST UPDATING METHOD, AND PROGRAM

CROSS REFERENCE TO RELATED APPLICATIONS

This application is a National Stage of International Application No. PCT/JP2011/003408 filed Jun. 15, 2011, claiming priority based on Japanese Patent Application No. 2010-137281 filed Jun. 16, 2010, the contents of all of which are incorporated herein by reference in their entirety.

TECHNICAL FIELD

The invention relates to a wireless communication system, a neighbor cell list optimizing system, a base station, a cell list updating method, a neighbor cell list updating program which updates a neighbor cell list.

BACKGROUND ART

Generally, as illustrated in FIG. 8, a wireless communication system includes mobile terminals 10, radio base stations 30, a mobile communication core network 50 and a network monitoring system 90.

The mobile terminal 10 transmits and receives data such as communication traffic or control traffic to and from the radio base station 30.

The radio base station 30 transmits and receives data to and from the mobile terminals 10 and the mobile communication core network 50 connected through wired links 40. In addition, around the radio base station 30, a radio cell 35 is provided as a range in which wireless links 20 to the mobile terminals 10 are effective.

The radio base station 30 manages the radio cell 35 provided therearound. The mobile terminals 10 exist in the radio cell 35 managed by the radio base station 30, and transmit and receive data to and from the radio base station 30.

The mobile communication core network 50 is realized by a switching point or a server device which is not illustrated. The mobile communication core network 50 is connected with the radio base stations 30 through the wired links 40, is also connected with an external network 70 through a wired link 60, and transmits and receives data to and from the radio base stations 30 and the external network 70.

The network monitoring system 90 is connected with the radio base stations 30 through the wired links 80, is connected with the mobile communication core network 50 through the wired link 81, and monitors quality, monitors failure and manages a configuration of the wireless communication system.

In such a wireless communication system, radio parameters of the radio base stations 30 need to be adequately set to satisfy predetermined communication quality in an entire service area of a service target. The radio parameters are typically, for example, total transmission power of the radio base stations 30, tilting angles of radio base station antennas in vertical and horizontal planes, a neighbor cell list and a handover threshold. Hereafter an explanation is made with assuming that a neighbor cell list is set to the radio base station 30 as a radio parameter.

Hereinafter, the neighbor cell list will be described. In the wireless communication system, services are provided by two dimensionally arranging radio cells in the entire service area wholly. When moving from a radio cell of a connection destination to another radio cell, the mobile terminal 10 performs switching processing of a connection destination radio cell which is referred to as "handover". Although an expression that a mobile terminal connects to a radio cell will be presented below, more specifically, this means that a mobile terminal connects to a radio base station which manages a radio cell. Further, handover processing is, more specifically, directed to switching a connection destination of a mobile terminal to a radio base station which manages another radio cell.

This handover processing will be realized as follows. The mobile terminal 10 is set (also referred to as "instructed" below) in advance to measure radio quality of a radio cell of a connection destination and neighbor cells neighboring to this radio cell, and, when radio quality of the connection destination radio cell deteriorates, transmits (also referred to as "reports" below) measured radio quality of the radio cell and the neighbor cells to the radio base station 30 which manages the connection destination radio cell. Further, at a point of time when receiving a report from the mobile terminal 10, the radio base station 30 decides a handover destination radio cell to realize handover.

In this case, a method of restricting handover destination radio cell candidates to a specific cell among neighbor cells is generally used to reduce a load on the mobile terminal 10 and process handover at a high speed. Meanwhile, the handover destination radio cell candidates are indicated by a neighbor cell list. The neighbor cell list is generated when communication carriers register radio cells per radio cell, and is transmitted (also referred to as "broadcasted" below) to the mobile terminals 10 from the radio base station 30 which manages the radio cell in downlink. Radio cells of neighbor cells which are registered in the neighbor cell list are referred to as "listed cells", and radio cells which are not registered in the neighbor cell list are referred to as "detected cells".

Hereinafter, an example will be described where formula (1) disclosed in Non Patent Literature 1 is used as operation conditions when the mobile terminal 10 reports measurement information to the radio base station 30.

$$P_s + O_s < P_t + O_t \quad \text{Formula (1)}$$

$P_s$ and $P_t$ represent received powers of pilot signals transmitted from the radio base station 30 which manages a connection destination radio cell and the radio base stations 30 (also referred to as "neighbor base stations 30" below) which manage neighbor cells. $O_s$ and $O_t$ represent offset values of the received powers. $O_s$ works on the received power of the pilot signal transmitted from the radio base station 30 which manages the connection destination radio cell. Further, $O_t$ works on the received power of the pilot signal transmitted from the neighbor base station 30. In addition, a value which varies per neighbor cell can be set to $O_t$.

When the operation conditions of formula (1) are set to the radio base station 30, this radio base station 30 transmits (also referred to as "notifies" below) the operation conditions of formula (1) to the mobile terminals 10 which connect to the managed radio cell. When the received powers of the pilot signals transmitted from the radio base station 30 which manages the connection destination radio cell and the neighbor base stations 30 satisfy the conditions of formula (1), the mobile terminal 10 is triggered to report measurement information of the pilot signals transmitted from the neighbor base station 30 to the radio base station 30.

In addition, when the conditions of formula (1) are satisfied, the mobile terminal 10 is triggered to report measurement information to the radio base station 30, and therefore formula (1) is referred to as "trigger conditions" in sometimes. Further, the parameter $Th_{HO}$ is also referred to as a "handover decision threshold" (handover threshold) by rewriting formula (1) to formula (2). This is because formula (1) is used as the trigger conditions for reporting deterioration of communication quality of a connection destination radio cell upon handover execution decision, from the mobile terminal 10 to the radio base station 30.

$$P_t - P_s > T_{hHO}$$

$$T_{hHO} = O_s - O_t \quad \text{Formula (2)}$$

According to such operation conditions, the radio base station 30 which receives a report of measurement information from the mobile terminal 10 generally decides a handover destination radio cell from listed cells of which radio quality is reported. Hence, the mobile terminal 10 cannot be generally handed over to a detected cell. Therefore, when there are radio cells registration of which is omitted in the neighbor cell list, there are concerns that a mobile terminal cannot be handed over to an adequate cell and then abnormal disconnection occurs halfway, and the mobile terminal is handed over to an inadequate radio cell and then communication quality deteriorates. Hence, how a neighbor cell list without omission of registration is generated is important to secure good communication quality.

Meanwhile, to suppress a load of a network which is required to broadcast the neighbor cell list and a load of the mobile terminal 10 which is required to measure and report radio quality, the number of radio cells registered in the neighbor cell list generally has an upper limit (LMax). Hence, it is necessary to preferentially register a radio cell which is highly likely to contribute to improving communication quality, in the neighbor cell list such that main radio cells are registered in the neighbor cell list.

Generally, a neighbor cell list requires an advanced technique for setting, and is optimized based on a result of a driving test in a service area of the wireless communication system. However, in recent years, a neighbor cell list optimizing system is studied which autonomously optimizes neighbor cell list while a wireless communication system is operated.

FIG. 9 is a view illustrating an example of a configuration of a wireless communication system which has the neighbor cell list optimizing system. A wireless communication system illustrated in FIG. 9 includes the mobile terminals 10, the radio base stations 30, the mobile communication core network 50, the network monitoring system 90 and a neighbor cell list optimizing system 95. In addition, in FIG. 9, the same configurations as in FIG. 8 will be assigned the same reference numerals, and will not be described.

The neighbor cell list optimizing system 95 is connected with the network monitoring system 90 through a wired link 82, and optimizes the neighbor cell list for the radio cell 35 managed by the radio base station 30.

Non Patent Literature 2 and Patent Literature 1 disclose neighbor cell list updating methods of neighbor cell list optimizing systems.

FIG. 10 is an explanation chart illustrating a neighbor cell list updating method disclosed in Non Patent Literature 2. In addition, according to the method disclosed in Non Patent Literature 2, a mobile terminal measures received power of a pilot signal transmitted from a radio base station as radio quality, and reports a connection destination radio cell to the radio base station.

According to the neighbor cell list updating method disclosed in Non Patent Literature 2, the number of trials (a) of handover to a listed cell is counted per listed cell registered in the neighbor cell list. Further, the number of reports (n) from mobile terminals that received power of a pilot signal transmitted from a radio base station which manages a detected cell is a threshold or more is counted per detected cell. Furthermore, detected cells the number of reports (n) of which is a threshold ($Th_{Add}$) or more are registered in the neighbor cell list in order from the radio cell of the highest number of reports (n), and listed cells the number of trials (a) of which is a threshold ($Th_{Del}$) or less are deleted from the neighbor cell list to update the neighbor cell list.

FIG. 11 is an explanation chart illustrating a neighbor cell list updating method disclosed in, for example, Patent Literature 1. In the wireless communication system disclosed in Patent Literature 1, a measuring radio device 5A is arranged in a radio cell (new cell) 35A managed by a radio base station 30A which does not yet provide communication service after the radio base station 30A is newly installed. Further, a mobile terminal 10B is connected to a radio cell (existing cell) 35B managed by a radio base station 30B which has already provided communication service.

According to the neighbor cell list updating method disclosed in Patent Literature 1, the measuring radio device 5A measures a signal intensity of a pilot signal transmitted from a radio base station which manages an existing cell, and reports the signal intensity to the radio base station 30A. The radio base station 30A requests the radio base station 30B which transmits a pilot signal of which measurement value of the signal intensity is a threshold or more to measure in the mobile terminal 10B connected to the existing cell 35B the signal intensity from the radio base station 30A and report the signal intensity to the radio base station 30A. Further, the radio base station 30A registers in the neighbor cell list the existing cell 35B to which the mobile terminal 10B which measures the signal intensity equal to or more than a threshold is connected, and updates the neighbor cell list of the new cell 35A.

Furthermore, Patent Literature 2 discloses a method which is directed to reducing a measurement report stand-by time of neighbor cells as a related technique. Patent Literature 3 discloses a method which is directed to maintaining precision of line quality required by a base station to allocate the frequency.

CITATION LIST

Patent Literature

PTL 1: U.S. Pat. No. 3,466,499
PTL 2: JP 2008-236727 A
PTL 3: JP 2008-288812 A

Non Patent Literature

NPL 1: 3GPP TS36.331 v8.4.0, pp. 66, 2008.
NPL 2: D. Soldani, "Self-optimizing Neighbor Cell List for UTRA FDD Networks Using Detected Set Reporting", pp. 694 to pp. 698, IEEE VTC 2007.

SUMMARY OF INVENTION

Technical Problem

However, according to a neighbor cell list updating method disclosed in Non Patent Literature 2, when the number of reports from mobile terminals connected to a radio cell which updates a neighbor cell list is small, reliable measurement results of neighbor cells cannot be quickly obtained. Therefore, there is a problem that it is difficult to quickly improve a flaw in neighbor cell list such as omission of registration of neighbor cells.

Further, according to the neighbor cell list updating method disclosed in Patent Literature 1, a neighbor cell list is updated only when a measuring radio device arranged in a new cell and a mobile terminal which connects to an existing cell detect the existing cell and the new cell, respectively. Therefore, there is a problem that, when the number of measuring radio devices to be arranged is small, detection of existing cells is omitted, and a flaw is produced in the neighbor cell list.

Similarly, even when methods disclosed in Patent Literature 2 and Patent Literature 3 are used, if reliable measurement results of neighbor cells cannot be obtained from mobile terminals connected to a radio cell, a flaw in the neighbor cell list cannot be quickly improved.

It is therefore an exemplary object of the invention to provide a wireless communication system, a neighbor cell list optimizing system, a base station, a neighbor cell list optimizing method and a neighbor cell list updating program which, even when reliable measurement results of neighbor cells cannot obtained from mobile terminals which exist in a radio cell, can quickly improve a flaw in a neighbor cell list.

Solution to Problem

A wireless communication system according to the invention includes: a first mobile terminal group; a first base station which manages a first cell in which the first mobile terminal group exists; a second mobile terminal group which is neighboring to the first cell and which exists in a second cell; a second base station which manages the second cell; and a neighbor cell list optimizing system which manages a neighbor cell list in which a specific neighbor cell which is a handover destination candidate of the first mobile terminal group is registered, and the first mobile terminal group has a first measurement information transmitting means which measures radio quality of a second cell, and transmits measurement information of the second cell to the first base station, the second mobile terminal group has a second measurement information transmitting means which measures radio quality of a first cell, and transmits measurement information of the first cell to the second base station, and the neighbor cell list optimizing system has: a measurement information collecting means which collects the measurement information of the second cell from the first base station, and which collects the measurement information of the first cell from the second base station; a reliability evaluating means which performs processing of evaluating reliability of the measurement information of the second cell; a priority calculating means which, when the reliability is a predetermined threshold or less, calculates a priority for registering the second cell in the neighbor cell list of the first cell based on the measurement information of the first cell; and a neighbor cell list updating means which performs control of determining a neighbor cell to register in the neighbor cell list, based on the priority calculated by the priority calculating means, and updating the neighbor cell list.

A neighbor cell list optimizing system according to the invention is a neighbor cell list optimizing system which updates a neighbor cell list which is set to a first base station which manages a first cell in which a first mobile terminal group exists, and in which a specific neighbor cell which is a handover destination candidate of the first mobile terminal group among second cells which are neighbor to the first cell and in which second mobile terminal groups exist is registered, and has: a measurement information collecting means which collects measurement information of radio quality of the second cells which is transmitted from the first mobile terminal group to the first base station, and measurement information of radio quality of the first cell which is transmitted from the second mobile terminal groups which exist in the second cells, to second base stations which manage the second cells; a reliability evaluating means which performs processing of evaluating reliability of the measurement information of the second cells; a priority calculating means which, when the reliability is a predetermined threshold or less, calculates a priority for registering the second cells in the neighbor cell list of the first cell based on the measurement information of the first cell; and a neighbor cell list updating means which performs control of determining a neighbor cell to register in the neighbor cell list, based on the priority calculated by the priority calculating means, and updating the neighbor cell list.

A base station according to the invention is a first base station which manages a first cell in which a first mobile terminal group exists, and which updates a neighbor cell list which is set to the first base station and in which a specific neighbor cell which is a handover destination candidate of the first mobile terminal group is registered, and includes: a measurement information collecting means which connects to a second base station which manages a second cell which is neighboring to the first cell and in which a second mobile terminal group exists, and which collects measurement information of radio quality of the second cell which is transmitted from the first mobile terminal group to the second base station, and measurement information of radio quality of the first cell which is transmitted from the second mobile terminal group to the second base station; a reliability evaluating means which performs processing of evaluating reliability of the measurement information of the second cell; a priority calculating means which, when the reliability is a predetermined threshold or less, calculates a priority for registering the second cell in the neighbor cell list of the first cell based on the measurement information of the first cell; and a neighbor cell list updating means which performs control of determining a neighbor cell to register in the neighbor cell list, based on the priority calculated by the priority calculating means, and updating the neighbor cell list.

A neighbor cell list updating method according to the invention is a neighbor cell list updating method of updating a neighbor cell list which is set to a first base station which manages a first cell in which a first mobile terminal group exists, and in which a specific neighbor cell which is a handover destination candidate of the first mobile terminal group among second cells which are neighbor to the first cell and in which second mobile terminal groups exist is registered, and includes: collecting measurement information of radio quality of the second cells which is transmitted from the first mobile terminal group to the first base station, and measurement information of radio quality of the first cell which is transmitted from the second mobile terminal groups which exist in the second cells, to second base stations which manage the second cells; performing processing of evaluating reliability of the collected measurement information of the second cells; when the evaluated reliability is a predetermined threshold or less, calculating a priority for registering the second cells in the neighbor cell list of the first cell based on the measurement information of the first cell; and performing control of determining a neighbor cell to register in the neighbor cell list, based on the calculated priority, and updating the neighbor cell list.

A neighbor cell list updating program according to the invention is a neighbor cell list updating program for updating a neighbor cell list which is set to a first base station which manages a first cell in which a first mobile terminal group exists, and in which a specific neighbor cell which is a handover destination candidate of the first mobile terminal group among second cells which are neighbor to the first cell and in which second mobile terminal groups exist is registered, and causes a computer to execute: measurement information collection processing of collecting measurement information of radio quality of the second cells which is transmitted from the first mobile terminal group to the first base station, and measurement information of radio quality of the first cell which is transmitted from the second mobile terminal groups which exist in the second cells to second base stations which manage the second cells; reliability evaluation processing of performing processing of evaluating reliability of the collected measurement information of the second cells; priority calculation processing of, when the evaluated reliability is a predetermined threshold or less, calculating a priority for registering the second cells in the neighbor cell list of the first cell based on the measurement information of the first cell; and neighbor cell list update processing of performing control of determining a neighbor cell to register in the neighbor cell list, based on the calculated priority, and updating the neighbor cell list.

Advantages Effects of Invention

The invention can quickly improve a flaw in a neighbor cell list even when reliable measurement results of neighbor cells cannot be obtained from mobile terminals which exist in a radio cell.

BRIEF DESCRIPTION OF DRAWINGS

FIG. 3 It depicts an explanation chart illustrating an example of management information managed by a priority calculating unit 104.

DESCRIPTION OF EMBODIMENTS

First Exemplary Embodiment

Figure 1:
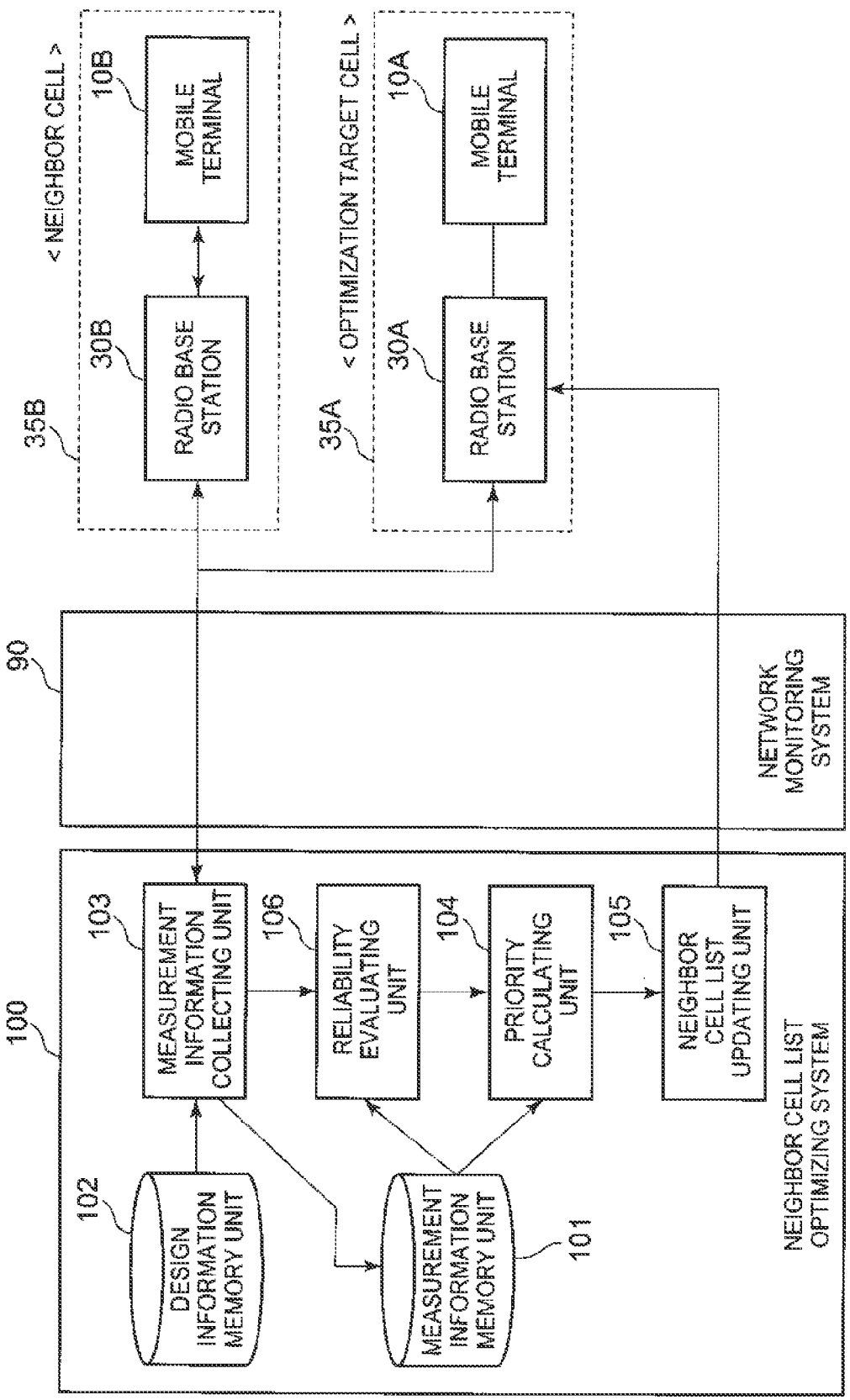
FIG. 1 It depicts a block diagram illustrating a configuration of a neighbor cell list optimizing system according to a first exemplary embodiment of the invention.

Hereinafter, exemplary embodiments for implementing the invention will be described with reference to the drawings. In addition, an example will be described below where a neighbor cell list optimizing system according to the invention updates a neighbor cell list set to radio base stations 30 in a wireless communication system illustrated in FIG. 9. Hence, the same configurations as in FIG. 9 will be assigned the same reference numerals, and will not be described.

FIG. 1 is a block diagram illustrating a configuration of a neighbor cell list optimizing system according to a first exemplary embodiment of the invention. A neighbor cell list optimizing system 100 illustrated in FIG. 1 has a measurement information memory unit 101, a design information memory unit 102, a measurement information collecting unit 103, a reliability evaluating unit 106, a priority calculating unit 104 and a neighbor cell list updating unit 105. Further, the neighbor cell list optimizing system 100 is mutually connected to a network monitoring system 90.

The neighbor cell list optimizing system 100 is, more specifically, realized by an information processing device such as a personal computer which operates according to a program. In addition, the neighbor cell list optimizing system 100 is not limited to a single information processing device, and may be realized by a plurality of information processing devices.

The measurement information memory unit 101 is, more specifically, realized by a storage device such as an optical disk device or a magnetic disk device. The measurement information memory unit 101 stores reports of measurement information from the mobile terminals 10 which connect to an optimization target cell of which the neighbor cell list is optimized or the mobile terminals 10 which connect to neighbor cells which are neighboring to the optimization target cell.

The report of measurement information is measurement information of radio quality of an optimization target cell and measurement quality of neighbor cells which are measured by the mobile terminal 10 and is reported to the radio base station 30. The measurement information is, more specifically, received powers and a signal to interference ratio of pilot signals transmitted from the radio base station 30 which manages the optimization target cell and neighbor base stations 30 which manage neighbor cells. In addition, neighbor cells include both of a listed cell and a detected cell.

The design information memory unit 102 is, more specifically, realized by a memory device such as an optical disk device or a magnetic disk device. The design information memory unit 102 stores position information of the radio base stations 30 which manage the optimization target cell and neighbor cells, or radio coverage information related to these radio cells.

The radio coverage information is information which defines a geographical range of a radio cell. Wireless coverage information can be generally estimated from transmission power of the radio base station 30 which manages a radio cell or design information such as an installation angle of an antenna.

The measurement information collecting unit 103 is, more specifically, realized by a CPU of the information processing device which operates according to a program. The measurement information collecting unit 103 has a function of collecting measurement information reported from the mobile terminals 10 which connect to the optimization target cell or neighbor cells, to the radio base station 30 to store in the measurement information memory unit 101. In addition, according to the exemplary embodiment, operation conditions for allowing the mobile terminals 10 to report measurement information are set to the radio base stations 30 in advance, and the operations conditions are broadcasted to the mobile terminals 10 in downlink. Further, a neighbor cell of the optimization target cell is determined based on, for example, position information and radio coverage information of radio base stations stored in the design information memory unit 102. A method of determining a neighbor cell will be described below when an operation will be described.

The reliability evaluating unit 106 is, more specifically, realized by the CPU of the information processing device which operates according to a program. The reliability evaluating unit 106 has a function of evaluating the reliability of measurement information per neighbor cell. More specifically, the reliability evaluating unit 106 extracts measurement information reported from the mobile terminals 10 connected to the optimization target cell or neighbor cells, from the measurement information memory unit 101. Further, the reliability evaluating unit 106 evaluates the reliability of measurement information per neighbor cell based on the extracted measurement information.

The priority calculating unit 104 is, more specifically, realized by the CPU of the information processing device which operates according to a program. The priority calculating unit 104 has a function of calculating the priority to register in the neighbor cell list of the optimization target cell per neighbor cell. More specifically, the priority calculating unit 104 extracts measurement information reported from the mobile terminals 10 connected to the optimization target cell or neighbor cells from the measurement information memory unit 101 according to the reliability of measurement information evaluated by the reliability evaluating unit 106. Further, the priority calculating unit 104 calculates the priority to register in the neighbor cell list of the optimization target cell per neighbor cell based on the extracted measurement information.

The neighbor cell list updating unit 105 is, more specifically, realized by the CPU of the information processing device which operates according to a program. The neighbor cell list updating unit 105 has a function of allowing the radio base stations 30 to update neighbor cell lists. More specifically, the neighbor cell list updating unit 105 determines a neighbor cell to register in the updated neighbor cell list based on the priority of each neighbor cell calculated by the priority calculating unit 104. Further, the neighbor cell list updating unit 105 reports update content to the radio base stations 30. Subsequently, the radio base station 30 updates the neighbor cell list based on the received update content. In addition, the neighbor cell list may be as default a list including radio cells managed by the radio base stations 30 obtained by, for example, referring to the design information memory unit 102, evaluating the radio base station 30 which manages the optimization target cell and other radio base stations 30 and extracting the radio base station in order from the nearest distance. Further, the neighbor cell list may be an empty neighbor cell list as default.

Figure 2:
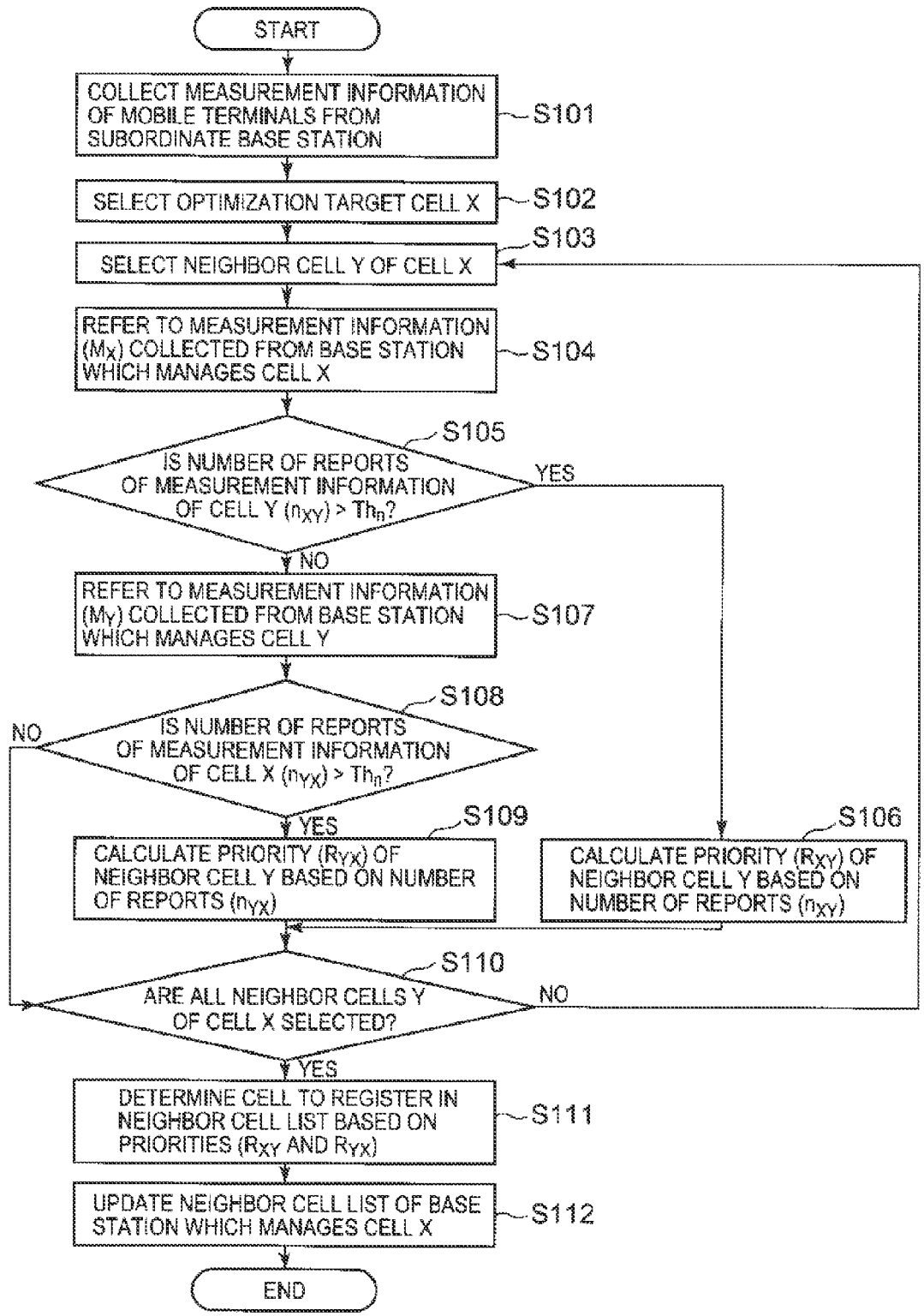
FIG. 2 It depicts a flowchart illustrating an operation example of a neighbor cell list optimizing system 100.

Next, an operation of the neighbor cell list optimizing system 100 will be described. FIG. 2 is a flowchart illustrating an operation example of the neighbor cell list optimizing system 100.

First, the measurement information collecting unit 103 sets operation conditions for allowing the mobile terminals 10 to report measurement information of neighbor cells, to all radio base stations 30 which are monitoring targets set by the neighbor cell list optimizing system 100 (also described as "subordinates of the neighbor cell list optimizing system 100"). The operation conditions set to the radio base station 30 are broadcasted to the mobile terminals 10 in downlink. More specifically, the measurement information collecting unit 103 transmits information indicating the operation conditions to each radio base station 30. Then, the radio base station 30 sets the operation conditions based on the information received from the measurement information collecting unit 103, and transmits this information to the mobile terminals 10 in downlink. Further, the mobile terminal 10 sets the operation conditions based on the information received from the radio base station 30.

Next, the measurement information collecting unit 103 collects measurement information of the neighbor cell reported from the mobile terminals 10 to the radio base station 30 according to the broadcasted operation conditions, and has the measurement information memory unit 101 store the measurement information (step S101).

More specifically, the mobile terminal 10 measures radio quality of a radio cell and radio quality of the neighbor cells according to the operation conditions, and transmits the measured measurement information to the radio base station 30. Then, the radio base station 30 temporarily accumulates the received measurement information. Further, the measurement information collecting unit 103 collects measurement information accumulated in the radio base stations 30. Meanwhile, the measurement information collecting unit 103 may extract information accumulated by the radio base stations 30 per predetermined period, or the radio base stations 30 may transfer measurement information received from the mobile terminals 10, to the measurement information collecting unit 103. Subsequently, the measurement information collecting unit 103 allows the measurement information memory unit 101 to store the collected measurement information. In addition, the operation conditions of reporting measurement information will be described at the end of description of this flowchart.

In step S101, after collecting measurement information from the radio base stations 30, the measurement information collecting unit 103 selects an optimization target cell (X) (step S102). Further, the measurement information collecting unit 103 extracts neighbor cells of the optimization target cell, and selects an arbitrary neighbor cell (Y) (step S103).

When selecting the optimization target cell in step S102, the measurement information collecting unit 103 sequentially selects, for example, all radio base stations 30 which are subordinates of the neighbor cell list optimizing system 100. Further, the measurement information collecting unit 103 may select a radio cell managed by a newly installed radio base station. Furthermore, the measurement information collecting unit 103 may detect a radio cell a handover failure rate of which is a threshold or more as a radio cell of deteriorated communication quality, and selects such a radio cell.

When extracting a neighbor cell of an optimization target cell X in step S103, the measurement information collecting unit 103 extracts, for example, all radio base stations 30 which have distances of a threshold or less from the radio base station 30 which manages the optimization target cell X. Further, the measurement information collecting unit 103 extracts radio cells managed by the extracted radio base stations as neighbor cells. Alternatively, the measurement information collecting unit 103 may extract as neighbor cells all radio cells wireless coverage of which overlap an area of the optimization target cell X at a threshold or more.

Next, after selecting the optimization target cell X and the neighbor cell Y in step S102 and step S103, the reliability evaluating unit 106 refers to measurement information which is stored in the measurement information memory unit 101 and which is collected from the mobile terminals connected to the optimization target cell X (step S104). Further, the reliability evaluating unit 106 evaluates the reliability of measurement information of the neighbor cell Y (step S105).

The reliability evaluating unit 106 evaluates the reliability of the measurement information of the neighbor cell Y based on, for example, the number of reports ($n_{XY}$) of the measurement information of the neighbor cell Y which is reported from the mobile terminals 10 connected to the optimization target cell X, to the radio base station 30 which manages the cell X. That is, when the number of reports ($n_{XY}$) is larger than a threshold ($Th_n$), the reliability evaluating unit 106 decides that the reliability of the measurement information of the neighbor cell Y is high.

A case is assumed where it is decided in step S105 that the reliability of the measurement information of the neighbor cell Y collected from the radio base station 30 which manages the optimization target cell X is low, that is, the number of reports ($n_{XY}$) from the mobile terminals 10 is a threshold ($Th_n$) or less. In this case, the reliability evaluating unit 106 refers to measurement information stored in the measurement information memory unit 101 and collected from mobile terminals connected to the neighbor cell Y (step S107), and evaluates the reliability of the measurement information of the optimization target cell X (step S108).

Similar to the reliability of the measurement information of the optimization target cell X, the reliability evaluating unit 106 evaluates the reliability of the measurement information of the optimization target cell X based on, for example, the number of reports ($n_{XY}$) of the measurement information of the optimization target cell X which is reported from the mobile terminals 10 connected to the neighbor cell Y, to the radio base station 30 which manages the cell Y. That is, when the number of reports ($n_{XY}$) is larger than a threshold ($Th_n$), the reliability evaluating unit 106 decides that the reliability of the measurement information of the optimization target cell X is high.

In step S108, when it is decided that the reliability of the measurement information of the optimization target cell X is low, that is, when the number of reports ($n_{XY}$) from the mobile terminals 10 is the threshold ($Th_n$) or less, the reliability evaluating unit 106 discards the selected neighbor cell Y and proceeds processing to step S110.

Meanwhile, in step S108, when deciding that the reliability of the measurement information of the optimization target cell X is high, the priority calculating unit 104 calculates the priority ($R_{YX}$) of the neighbor cell Y, based on measurement information collected from the mobile terminals connected to the neighbor cell Y (step S109).

Further, in step S105, when deciding that the reliability of the measurement information of the neighbor cell Y is high, the priority calculating unit 104 calculates the priority ($R_{XY}$) of the neighbor cell Y based on measurement information collected from the mobile terminals connected to the optimization target cell X (step S106). Details of a method of calculating the priorities $R_{YX}$ and $R_{YX}$ will be described below using FIG. 3.

In the exemplary embodiment, according to this processing, even when sufficient measurement information cannot be acquired from mobile terminals (also described as "subordinate mobile terminals of a cell" below) connected to a base station of a cell which is a target to optimize a neighbor list, if sufficient measurement information can be acquired from subordinate mobile terminals of a neighbor cell, it is possible to quickly optimize the neighbor list.

The neighbor cell list optimizing system 100 executes processings in above step S103 to step S109 with respect to all neighbor cells extracted by the measurement information collecting unit 103 (step S110). Subsequently, the neighbor cell list updating unit 105 determines radio cells to register in the updated neighbor cell list based on the priorities ($R_{YX}$ and $R_{YX}$) calculated in step S106 or step S109 (step S111).

More specifically, the neighbor cell list updating unit 105 extracts neighbor cells in order from the highest priority by using the number of radio cells (LMax) which can be registered in a neighbor cell list as an upper limit, and determines the extracted neighbor cells as radio cells to register in the updated neighbor cell list. In this case, the neighbor cell list updating unit 105 may remove neighbor cells having priorities equal to or less than a threshold ($Th_{Del}$) from a neighbor cell list registration target.

The neighbor cell list updating unit 105 further notifies update content of the neighbor cell list to the radio base stations 30, allows the radio base stations 30 to update the neighbor cell list (step S112), and finishes processing. More specifically, when the neighbor cell list updating unit 105 transmits information indicating the update content of the neighbor cell list, to the radio base stations 30, the radio base stations 30 update the stored neighbor cell lists according to the received information indicating the update content.

Next, operation conditions for reporting measurement information will be described. An example will be described with the present exemplary embodiment where formula (1) disclosed in Non Patent Literature 2 is used as operation conditions.

When the trigger conditions of formula (1) are used to decide whether or not to execute handover, the mobile terminal 10 generally measures radio quality of a listed cell registered in the neighbor cell list. Meanwhile, in the exemplary embodiment, the measurement information collecting unit 103 requests the mobile terminals 10 to measure radio quality of listed cells and detected cells.

In addition, an example will be described with the exemplary embodiment where the same conditions for deciding whether or not to execute handover are used as trigger conditions for reporting measurement information. Meanwhile, a value different from a handover threshold for deciding whether or not to execute handover may be set as trigger conditions by, for example, setting a parameter $Th_{HO}$ to a value smaller than a value set to decide whether or not execute handover and having mobile terminals which are not handed over report measurement information such that measurement information is reported from a greater number of mobile terminals.

Further, although the example has been described with the exemplary embodiment where the same trigger conditions are set to a radio base station which manages an optimization target cell and radio base stations which manage neighbor cells, different trigger conditions may be set to both of radio base stations. When, for example, the parameter $Th_{HO}$ is set to a value smaller than a value used to decide whether or not to execute handover, cells which are not necessary for handover are likely to be registered in the updated neighbor cell list. Hence, different trigger conditions may be set by, for example, setting a value used to decide whether or not to execute handover, to the parameter $Th_{HO}$ in a radio base station which manages the optimization target cell, and setting a value smaller than a value used to decide whether or not to execute handover, to the parameter $Th_{HO}$ in the radio base stations which manage neighbor cells.

Further, an example has been described with the exemplary embodiment where the measurement information collecting unit 103 requests all mobile terminals 10 connected to an optimization target cell to measure radio quality. However, part of the mobile terminals 10 connected to the optimization target cell may be requested to perform measurement by requesting only the mobile terminals 10 extracted at random at a certain rate from the mobile terminals 10 connected to the optimization target cell to perform measurement.

Further, an example has been described with the exemplary embodiment where the single mobile terminal 10 is requested to measure radio quality of a listed cell and a detected cell. However, a specific mobile terminal may measure only radio quality of one radio cell by, for example, requesting part of the mobile terminals 10 among the mobile terminals 10 which are requested to measure radio quality of listed cells to also measure radio quality of detected cells.

Further, although an example has been described with the exemplary embodiment where received power of a pilot signal transmitted from the radio base station 30 is measured as radio quality, an index of another radio quality such as a signal to interference ratio may be measured.

Furthermore, an example has been described with the exemplary embodiment where the trigger conditions of formula (1) are used as operation conditions. Meanwhile, other conditions that, when, for example, Pt is a threshold or more or when a signal to interference ratio of a pilot signal transmitted from the neighbor base station 30 is a predetermined threshold or more, the mobile terminals 10 are requested to report may be used as operation conditions.

Next, a method of calculating the priority will be described. FIG. 3 is an explanation chart illustrating an example of management information managed by the priority calculating unit 104, based on measurement information stored in the measurement information memory unit 101.

As illustrated in FIG. 3, the priority calculating unit 104 manages as management information a counting table 111 obtained by counting per neighbor cell the number of times ($n_{XY}$) of reporting radio quality of the neighbor cell Y from the mobile terminals 10 connected to the optimization target cell X. Further, the priority calculating unit 104 manages as management information a counting table 112 obtained by counting per neighbor cell the number of times ($n_{YX}$) of reporting radio quality of the optimization target cell X from the mobile terminals 10 connected to the neighbor cell Y. In addition, the priority calculating unit 104 counts only reports that received power of a pilot signal is a threshold or more.

More specifically, the priority calculating unit 104 refers to the measurement information memory unit 101 per predetermined period, and counts the number of times ($n_{XY}$) and the number of times ($n_{YX}$) per neighbor cell. Further, the priority calculating unit 104 stores a counting result in the memory unit as the counting table 111 or the counting table 112. In addition, the priority calculating unit 104 may store the counting table 111 and the counting table 112 in the measurement information memory unit 101 or the priority calculating unit 104 may have a memory unit and store the counting table 111 and the counting table 112 in this memory unit.

The priority calculating unit 104 evaluates the priority of a neighbor cell to register in the neighbor cell list, based on the number of reports of measurement information of each neighbor cell counted in a predetermined period. The priority calculating unit 104 calculates, for example, the priority ($R_{XY}$) calculated in step S106 and the priority ($R_{YX}$) calculated in step S109 using formula (3).

$$R_{XY}=n_{XY}/\Sigma_i(n_{Xi})$$

$$R_{YX}=n_{YX}/\Sigma_i(n_{iX}) \quad \text{Formula (3)}$$

Meanwhile, $n_{Xi}$ is the number of times of reporting measurement information of a neighbor cell i from mobile terminals connected to the optimization target cell X. Further, $n_{iX}$ is the number of times of reporting measurement information of the optimization target cell X from mobile terminals connected to the neighbor cell i. $\Sigma(n_{Xi})$ is a total sum of the number of reports of measurement information reported from mobile terminals connected to the optimization target cell X. Further, $\Sigma(n_{iX})$ is the total number of the number of reports of measurement information collected from a neighbor cell of the optimization target cell X and related to the optimization target cell X.

Thus, according to the exemplary embodiment, when the reliability of measurement information of the neighbor cell Y collected from the radio base station 30 which manages the optimization target cell X is low, the neighbor cell list optimizing system 100 calculates the priority ($R_{YX}$) for registering the neighbor cell Y in the neighbor cell list of the optimization target cell X based on measurement information collected from the radio base station 30 which manages the neighbor cell Y. Further, the neighbor cell list optimizing system 100 decides whether or not to register the neighbor cell Y in the neighbor cell list based on the calculated priority ($R_{YX}$)

Hence, even when the number of mobile terminals connected to the optimization target cell X is small, if the number of mobile terminals connected to the neighbor cell Y is large, it is possible to quickly improve a flaw of the neighbor cell list such as omission of registration of neighbor cells. Meanwhile, it is possible to remove from the neighbor cell list unnecessary neighbor cells among neighbor cells registered in the neighbor cell list of the optimization target cell X based on measurement information collected from the radio base stations 30 which manage neighbor cells at a point of time when the number of reports of measurement information from mobile terminals connected to the optimization target cell X increases.

Figure 4:
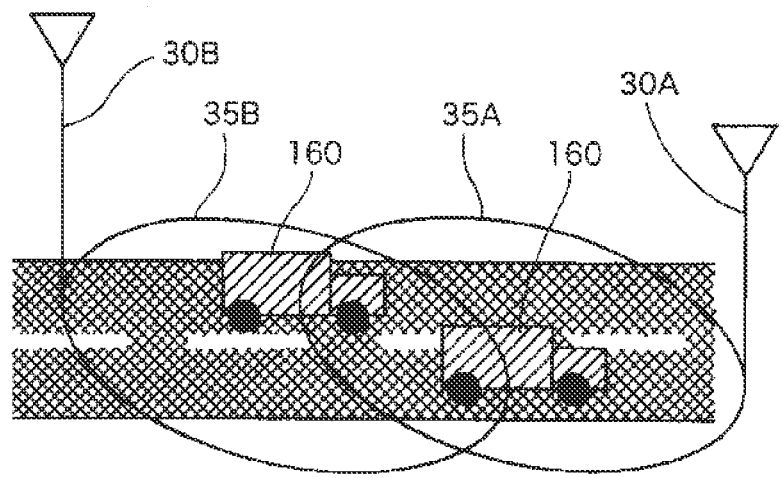
FIG. 4 It depicts an explanation chart illustrating an effect of the neighbor cell list optimizing system according to the first exemplary embodiment.
Figure 5:
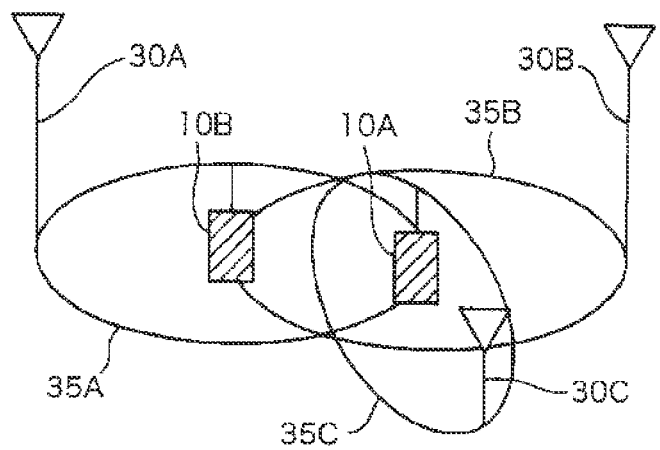
FIG. 5 It depicts an explanation chart illustrating the effect of the neighbor cell list optimizing system according to the first exemplary embodiment.

FIGS. 4 and 5 are explanation charts illustrating examples of such unnecessary neighbor cells.

FIG. 4 illustrates that radio cells cover a highway. In such an environment, mobile terminals which are positioned inside cars 160 and are moving with the cars 160 are handed over only in one direction from a radio cell 35B to a radio cell 35A. Hence, it is not necessary to register the radio cell 35B in a neighbor cell list of the radio cell 35A. There are cases with the exemplary embodiment where, when the number of reports of measurement information from mobile terminals connected to the radio cell 35A is small, the radio cell 35B is registered in the neighbor cell list of the radio cell 35A. However, it is possible to remove the radio cell 35B from the neighbor cell list of the radio cell 35A based on measurement information from the mobile terminals connected to the radio cell 35A at a point of time when the number of reports of measurement information from mobile terminals connected to the radio cell 35A increases.

FIG. 5 illustrates that a pilot signal of a radio cell 35C having a strong signal intensity interrupts between the radio cell 35A and the radio cell 35B. In such an environment, when the mobile terminal 10A connected to the radio cell 35A moves to the radio cell 35B, the mobile terminal 10A is handed over to the radio cell 35B via the radio cell 35C without being handed over directly from the radio cell 35A to the radio cell 35B. Hence, it is not necessary to register the radio cell 35B in a neighbor cell list of the radio cell 35A. There are cases with the exemplary embodiment where, when the number of reports of measurement information from mobile terminals connected to the radio cell 35A is small, if the mobile terminal 10B connected to the radio cell 35B reports measurement information of the radio cell 35A to the radio base station 30B, the radio cell 35B is registered in the neighbor cell list of the radio cell 35A. However, it is possible to remove the radio cell 35B from the neighbor cell list of the radio cell 35A based on measurement information from the mobile terminals connected to the radio cell 35A at a point of time when the number of reports of measurement information from mobile terminals connected to the radio cell 35A increases.

Second Exemplary Embodiment

A neighbor cell list optimizing system 200 according to a second exemplary embodiment differs from the first exemplary embodiment in the following points. In the exemplary embodiment, a weighted average of a priority calculated based on measurement information collected from a radio base station 30 which manages an optimization target cell and a priority calculated based on measurement information collected from the radio base stations 30 which manage neighbor cells of the optimization target cell is calculated, and a priority for registering a neighbor cell in a neighbor cell list of an optimization target cell is calculated.

Figure 6:
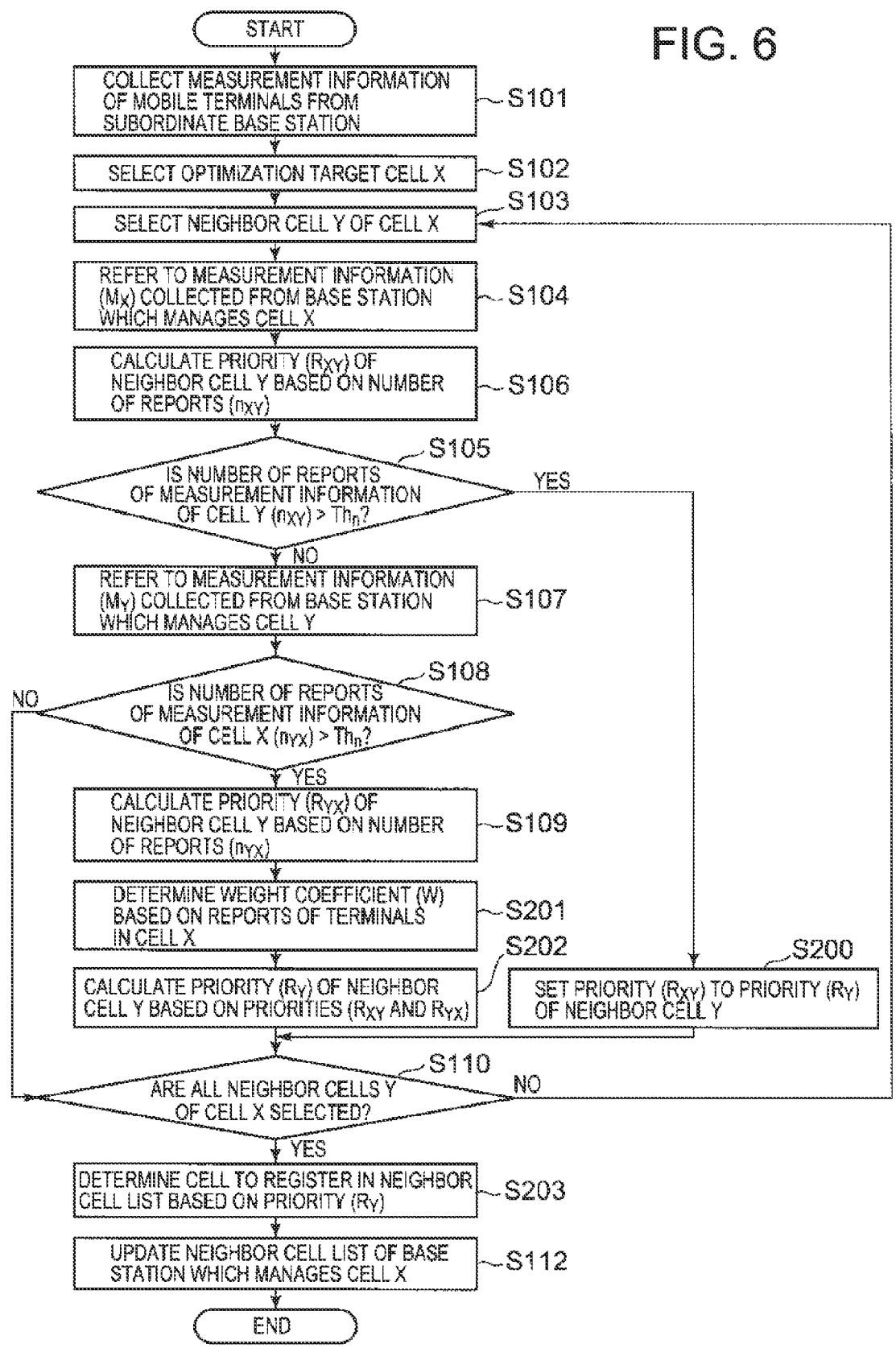
FIG. 6 It depicts a flowchart explaining an operation of the neighbor cell list optimizing system according to a second exemplary embodiment.

FIG. 6 is a flowchart illustrating an operation example of the neighbor cell list optimizing system 200. In addition, in FIG. 6, the same processings as in FIG. 2 will be assigned the same reference numerals and will not be described.

In the exemplary embodiment, after step S104, a priority calculating unit 104 calculates a priority ($R_{XY}$) of a neighbor cell Y irrespectively of the reliability of measurement information of the neighbor cell Y collected from the radio base station 30 which manages the optimization target cell X (step S106). Subsequently, the priority calculating unit 104 proceeds processing to step S105.

In step S105, when deciding that the reliability of measurement information of the neighbor cell Y collected from the radio base station 30 which manages the optimization target cell X is high, the priority calculating unit 104 adopts a priority ($R_{XY}$) as a priority ($R_Y$) of the neighbor cell Y (step S200).

Meanwhile, a case is assumed where it is decided in step S105 that the reliability of the measurement information of the neighbor cell Y collected from the radio base station 30 which manages the optimization target cell X is low. In this case, the priority calculating unit 104 determines a weight coefficient (w) based on the reliability of the measurement information of the neighbor cell Y collected from the radio base station 30 which manages the optimization target cell X (step S201).

Next, the priority calculating unit 104 calculates a weighted average of the priority ($R_{XY}$) calculated based on measurement information of the neighbor cell Y collected from the radio base station 30 which manages the optimization target cell X and the priority ($R_{YX}$) calculated based on measurement information of the optimization target cell X collected from the radio base station 30 which manages the neighbor cell Y, and calculates the priority ($R_Y$) for registering the neighbor cell Y in the neighbor cell list of the optimization target cell X (step S202).

The priority calculating unit 104 can calculate a weighted average value ($R_Y$) of the priority using, for example, formula (4).

$$R_Y = w \cdot R_{XY} + (1-w) \cdot R_{YX} \qquad \text{Formula (4)}$$

Figure 7:
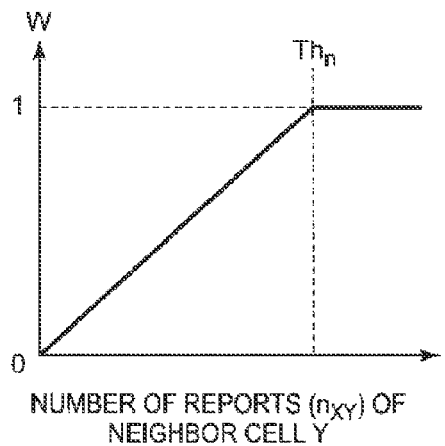
FIG. 7 It depicts an explanation chart illustrating an example of an evaluation function which the neighbor cell list optimizing system according to the second exemplary embodiment uses to calculate a priority.
Figure 8:
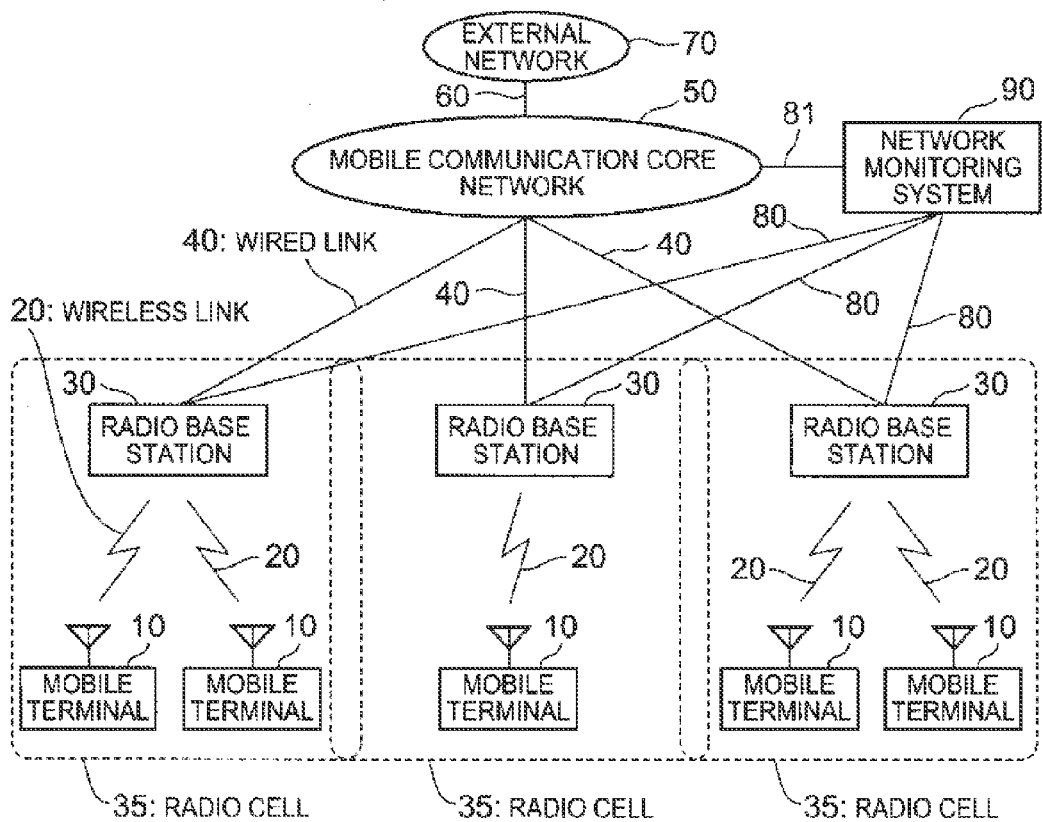
FIG. 8 It depicts an explanation chart illustrating an example of a configuration of a general wireless communication system.

The weight coefficient (w) can be determined using, for example, an evaluation function illustrated in FIG. 7. As illustrated in FIG. 7, the weight coefficient (w) can be calculated as an output of an evaluation function which receives an input of the number of reports ($n_{XY}$) of measurement information of the neighbor cell Y collected from the radio base station 30 which manages the optimization target cell X.

In addition, the evaluation function only needs to be a function of which output increases in a range equal to or more than 0 and equal to or less than 1 according to an increase in the reliability of measurement information, and does not need to be a function which linearly increases according to an increase in the number of reports. For example, in an environment in which, after the optimization target cell is installed, the number of mobile terminals in a cell increases as a time passes and the reliability of measurement information increases, an evaluation function like formula (5) may be used. Meanwhile, $\alpha$ ($\alpha > 1$) and $\beta$ ($\beta > 0$) are constants, t is a time passed after the optimization target cell is installed.

$$W = 1 - \alpha^{-\beta \cdot t} \qquad \text{Formula (5)}$$

In the exemplary embodiment, the neighbor cell list optimizing system 100 executes processings in above step S103 to step S202 or S200 with respect to all neighbor cells extracted by a measurement information collecting unit 103 (step S110).

Next, the neighbor cell list updating unit 105 extracts neighbor cells in order from the highest priority ($R_Y$) calculated in step S200 or step S202 by using the number of radio cells (LMax) which can be registered in a neighbor cell list as an upper limit. Further, the neighbor cell list updating unit 105 determines the extracted neighbor cells as radio cells to register in the updated neighbor cell list (step S203).

Thus, according to the exemplary embodiment, the neighbor cell list optimizing system 200 calculates the priority ($R_{XY}$) based on measurement information of the neighbor cell Y collected from the radio base station 30 which manages the optimization target cell X. The neighbor cell list optimizing system 200 calculates the priority ($R_{YX}$) based on measurement information of the optimization target cell X collected from the radio base station 30 which manages the neighbor cell Y. Further, the neighbor cell list optimizing system 200 calculates a weighted average of the calculated priority ($R_{XY}$) and priority ($R_{YX}$), and calculates the priority ($R_Y$) for registering the neighbor cell Y in the neighbor cell list of the optimization target cell X.

For example, a case will be assumed where a significant difference is produced between the priority ($R_{XY}$) determined based on measurement information collected from the radio base station 30 which manages the optimization target cell X and the priority ($R_{YX}$) determined based on measurement information collected from the radio base station 30 which manages the neighbor cell Y. In this case, according to the first exemplary embodiment, the priorities of neighbor cells upon switching the priority to be adopted significantly change, a configuration of the neighbor list significantly changes and a network is likely to be unstable.

By contrast with this, according to the exemplary embodiment, the priority ($R_{XY}$) and the priority ($R_{YX}$) can be gradually switched according to the reliability of measurement information of the neighbor cell Y collected from the radio base station 30 which manages the optimization target cell X, so that it is possible to maintain the network more stable.

Figure 9:
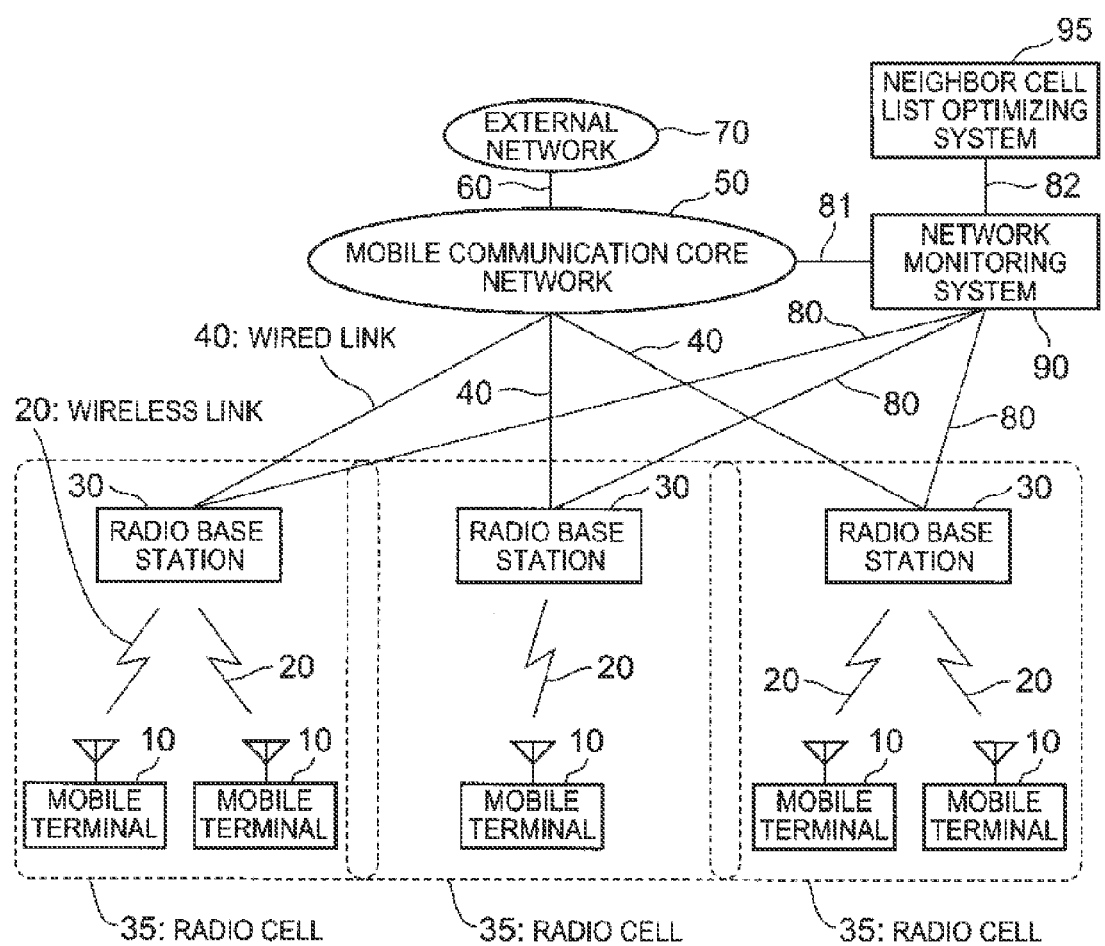
FIG. 9 It depicts an explanation chart illustrating an example of a configuration of a wireless communication system which has the neighbor cell list optimizing system.
Figure 10:
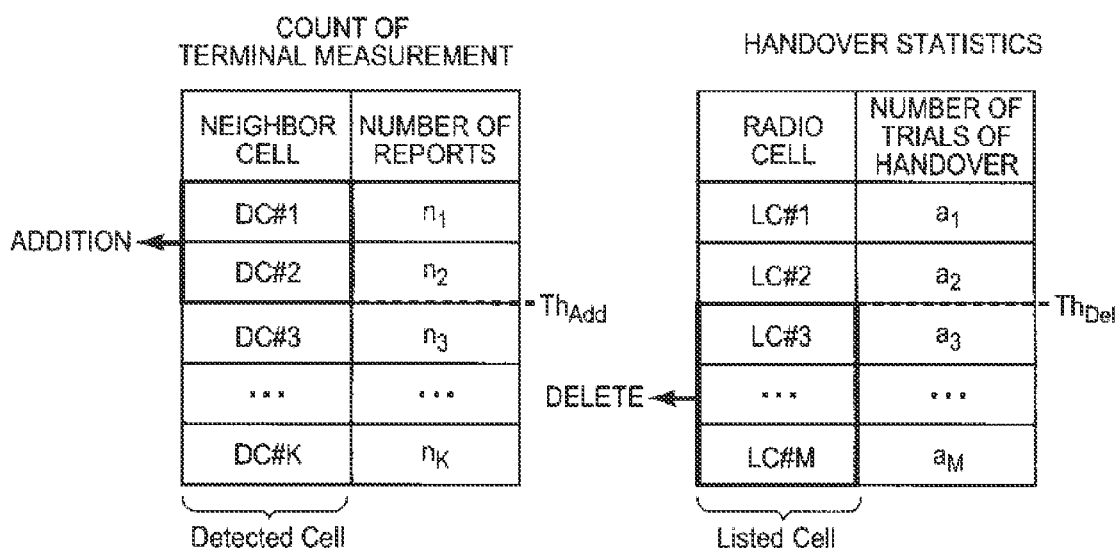
FIG. 10 It depicts an explanation chart illustrating a neighbor cell list updating method disclosed in Non Patent Literature 2.
Figure 11:
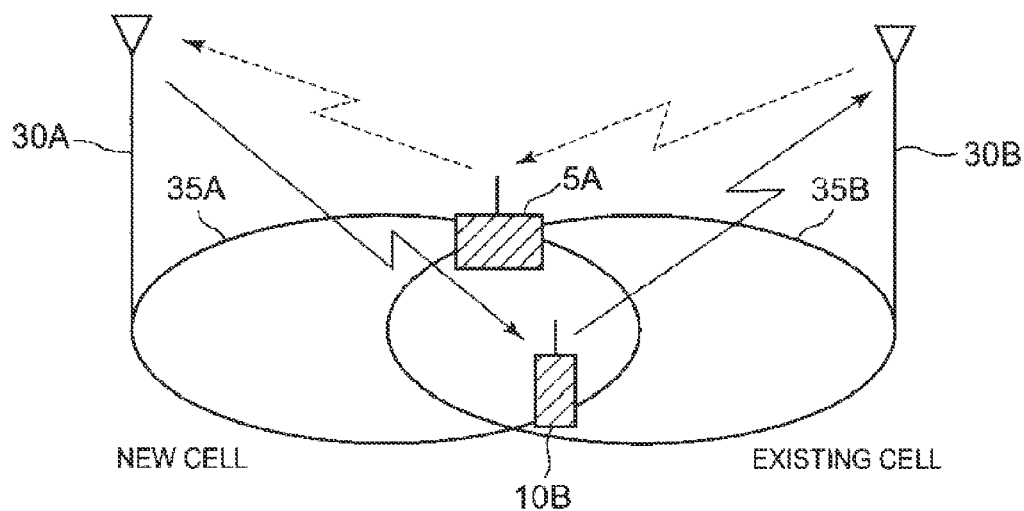
FIG. 11 It depicts an explanation chart illustrating a neighbor cell list updating method disclosed in Patent Literature 1.

In addition, the invention is by no means limited to a wireless communication system illustrated in FIG. 9, and is applicable in a scope without deviating from a basic technical idea of the invention. For example, the invention is also applicable to a wireless communication system which has a radio base station control device between a mobile communication core network 50 and the radio base stations 30, or a wireless communication system in which a function of a neighbor cell list optimizing system is incorporated inside a radio base station control device, the radio base station 30 or a network monitoring system. Further, the invention is applicable even when a radio base station managing device is provided between the neighbor cell list optimizing system and the radio base station 30.

Furthermore, although an example has been described where the neighbor cell list optimizing system manages a counting result of measurement information of radio quality measured by the mobile terminals 10, a counting result may be managed inside the base station control device, the radio base station 30 or the network monitoring system. Still further, when the radio base station 30 has the same function as the function of the mobile terminal 10 of measuring radio quality, the radio base station 30 may measure radio quality.

Moreover, although examples have been described with the above first and second exemplary embodiments where the wireless communication system has the neighbor cell list optimizing system in addition to the radio base stations 30, and neighbor cell lists set to the radio base stations 30 are updated by the neighbor cell list optimizing system, the invention is by no means limited to this. For example, the radio base station 30 can execute the same processing as the neighbor cell list optimizing system, and update the neighbor cell list set to this radio base station 30.

The radio base station 30 can collect or store one of measurement information and radio coverage information. The radio base station 30 can calculate the priority of a neighbor cell based on these pieces of information, determine radio cells to register in the neighbor cell list set to the radio base station 30 based on the calculated priority and updates the neighbor cell list.

Similar to the method disclosed in Non Patent Literature 2, the invention evaluates the reliability of measurement information acquired from mobile terminals connected to a radio cell the neighbor cell list of which is updated instead of determining a neighbor cell using only measurement information of the mobile terminals connected to a radio cell of which neighbor cell list is updated. Further, when the reliability is not sufficient, a neighbor cell to register in the neighbor cell list is determined based on measurement information acquired from mobile terminals connected to the neighbor cell of a radio cell of which neighbor cell list is updated.

Furthermore, similar to the method disclosed in Patent Literature 1, the invention includes an operation of determining a neighbor cell to register in the neighbor cell list based only on measurement information of mobile terminals connected to a neighbor cell instead of registering a neighbor cell in the neighbor cell list of the radio cell only when a measuring radio device arranged in a radio cell of which neighbor cell list is updated and mobile terminals connected to the neighbor cell detect the neighbor cell and the radio cell.

Consequently, reliable measurement information is quickly secured using mobile terminals connected to a neighbor cell of a radio cell the neighbor cell list of which is updated in combination, so that it is possible to provide an advantage of quickly improving a flaw of the neighbor cell list such as omission of registration of neighbor cells.

Further, a neighbor cell to register in the neighbor cell list is determined irrespectively of a measurement result of the measuring radio device arranged in a radio cell of which neighbor cell list is updated. Hence, even when the number of measuring radio devices to be arranged is small, it is possible to provide an advantage that a flaw such as omission of registration in the neighbor cell list to be generated is hardly produced.

Figure 12:
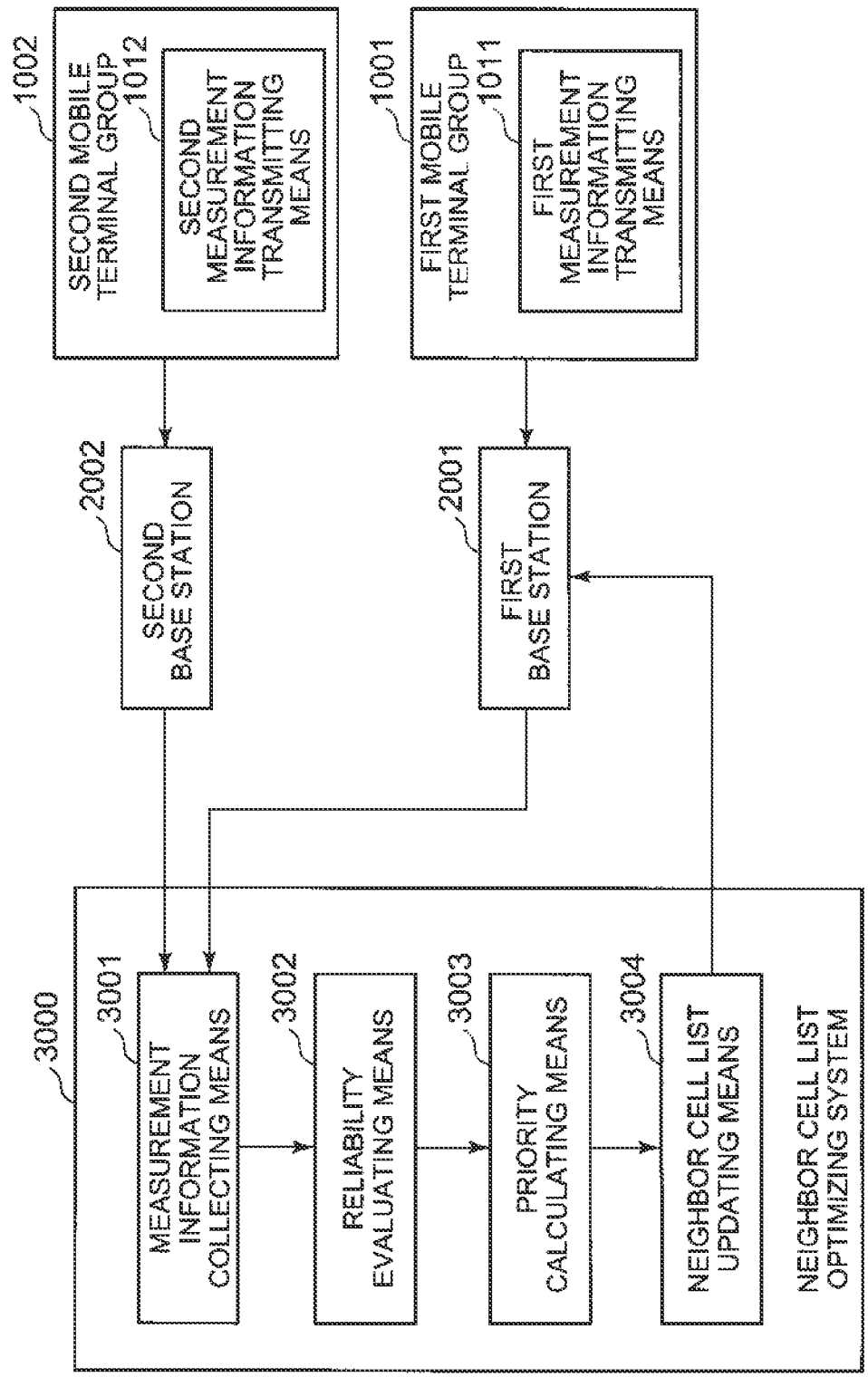
FIG. 12 It depicts a block diagram illustrating a minimum configuration example of a wireless communication system.

Next, a minimum configuration of the wireless communication system according to the invention will be described. FIG. 12 is a block diagram illustrating a minimum configuration example of a wireless communication system. As illustrated in FIG. 12, a wireless communication system has a first mobile terminal group 1001, a first base station 2001 which manages a first cell in which the first mobile terminal group 1001 exists, a second mobile terminal group 1002 which exists in a second cell neighbor to the first cell, a second base station 2002 which manages the second cell, and a neighbor cell list optimizing system 3000 which manages the neighbor cell list in which a specific neighbor cell which is a handover destination candidate of the first mobile terminal group is registered.

Further, the first mobile terminal group 1001 has a first measurement information transmitting means 1011 which measures radio quality of the second cell, and transmits measurement information of the second cell to the first base station 2001. Furthermore, the second mobile terminal group 1002 has a second measurement information transmitting means 1012 which measures radio quality of a first cell, and transmits measurement information of the first cell to the second base station 2002.

Still further, the neighbor cell list optimizing system 3000 has a measurement information collecting means 3001, a reliability evaluating means 3002, a priority calculating means 3003 and a neighbor cell list updating means 3004.

In the wireless communication system employing the minimum configuration illustrated in FIG. 12, the measurement information collecting means 3001 collects measurement information of the second cell from the first base station 2001, and collects measurement information of the first cell from the second base station 2002. Next, the reliability evaluating means 3002 performs processing of evaluating reliability of the measurement information of the second cell collected by the measurement information collecting means 3001. Next, when the reliability evaluated by the reliability evaluating means 3002 is a predetermined threshold or less, the priority calculating means 3003 calculates the priority for registering the second cell in the neighbor cell list of the first cell based on the measurement information of the first cell. Next, the neighbor cell list updating means 3004 performs control of determining a neighbor cell to register in the neighbor cell list, based on the priority calculated by the priority calculating means 3003, and updating the neighbor cell list.

Consequently, the wireless communication system employing the minimum configuration can quickly improve a flaw in a neighbor cell list even when reliable measurement results of neighbor cells cannot be obtained from mobile terminals which exist in radio cells.

In addition, the following characteristic configurations (1) to (10) of the wireless communication configurations are described with the exemplary embodiment.

(1) A wireless communication system includes: a first mobile terminal group (for example, a mobile terminal 10A); a first base station (for example, a radio base station 30A) which manages a first cell (for example, an optimization target cell 35A) in which the first mobile terminal group exists; a second mobile terminal group (for example, a mobile terminal 10B) in which a second cell (for example, a neighbor cell 35B) which is neighboring to the first cell exists; a second base station (for example, a radio base station 30B) which manages the second cell; and a neighbor cell list optimizing system (for example, a neighbor cell list optimizing system 100) which manages a neighbor cell list in which a specific neighbor cell which is a handover destination candidate of the first mobile terminal group is registered, and the first mobile terminal group has a first measurement information transmitting means (realized when, for example, the mobile terminal 10A executes processing according to operation conditions) which measures radio quality of the second cell, and transmits measurement information of the second cell to the first base station, the second mobile terminal group has a second measurement information transmitting means (realized when, for example, the mobile terminal 10B executes processing according to operation conditions) which measures radio quality of the first cell, and transmits measurement information of the first cell to the second base station, and the neighbor cell list optimizing system includes: a measurement information collecting means (realized by, for example, a measurement information collecting unit 103) which collects the measurement information of the second cell from the first base station, and collects the measurement information of the first cell from the second base station; a reliability evaluating means (realized by, for example, a reliability evaluating unit 106) which performs processing of evaluating reliability of the measurement information of the second cell; a priority calculating means (realized by, for example, a priority calculating unit 104) which, when the reliability is a predetermined threshold or less, calculates a priority for registering the second cell in the neighbor cell list of the first cell based on the measurement information of the first cell; and a neighbor cell list updating means (realized by, for example, a neighbor cell list updating unit 105) which performs control of determining a neighbor cell to register in the neighbor cell list, based on the priority calculated by the priority calculating means, and updating the neighbor cell list.

(2) In the wireless communication system, the reliability evaluating means may be configured to perform processing of counting a number of pieces of received measurement information of the second cell in a predetermined counting period (for example, uses a counting table illustrated in FIG. 3), and evaluating the reliability of the measurement information of the second cell based on the counted number of pieces of received measurement information.

(3) In the wireless communication system, the priority calculating means may be configured to, when the reliability is a predetermined threshold or less, count a number of pieces of received measurement information of the first cell in a predetermined counting period, and calculate the priority of the second cell based on the counted number of pieces of received measurement information.

(4) In the wireless communication system, the priority calculating means may be configured to, when the reliability is the predetermined threshold or less, calculate a weighted average of a first priority calculated based on the number of pieces of received measurement information of the first cell and a second priority calculated based on the counted number of pieces of received measurement information obtained by counting the number of pieces of received measurement information of the second cell in a predetermined counting period, and calculate the priority of the second cell based on the weighted average value of the second priority (calculated by, for example, using formula (4)).

(5) In the wireless communication system, the priority calculating means may be configured to determine a weight coefficient (for example, a weight coefficient w) of the weighted average based on the reliability of the measurement information of the second cell.

(6) In the wireless communication system, the priority calculating means may be configured to determine (for example, calculate using formula (5)) a weight coefficient of the weighted average based on a time passed after the first cell is set.

(7) In the wireless communication system, a first measurement information transmitting means may be configured to transmit the measurement information of the second cell to a first base station when measured radio quality exceeds a predetermined quality threshold, a second measurement transmitting means may be configured to transmit the measurement information of the first cell to a second base station when the measured radio quality exceeds a predetermined quality threshold, and the measurement collecting means may be configured to, when the reliability is a predetermined threshold or less, set the predetermined quality threshold lower than a handover threshold to the second base station such that the measurement information of the first cell increases.

(8) In the wireless communication system, the first measurement information transmitting means may be configured to measure at least one of received power and a signal to interference ratio of a first pilot signal transmitted from the second base station, and the second measurement information transmitting means may be configured to measure at least one of received power and the signal to interference ratio of a second pilot signal transmitted from the first base station.

(9) In the wireless communication system, the first measurement information transmitting means may be configured to transmit the measurement information of the second cell to the first base station when at least one of the received power of the first pilot signal, the signal to interference ratio of the first pilot signal, a ratio of the received power of the first pilot signal to the received power of the second pilot signal and a ratio of the signal to interference ratio of the first pilot signal to the signal to interference ratio of the second pilot signal exceeds a predetermined quality threshold.

(10) In the wireless communication system, the second measurement information transmitting means may be configured to transmit the measurement information of the first cell to the second base station when at least one of the received power of the second pilot signal, the signal to interference ratio of the second pilot signal, a ratio of the received power of the second pilot signal to the received power of the first pilot signal and a ratio of the signal to interference ratio of the second pilot signal to the signal to interference ratio of the first pilot signal exceeds a predetermined quality threshold.

Although the invention has been described above referring to the exemplary embodiments and the examples, the invention is by no means limited to the above exemplary embodiments and examples. The configuration and the details of the invention can be variously modified within a scope of the invention which can be understood by those who are skilled in art.

This application claims priority to Japanese Patent Application No. 2010-137281 filed on Jun. 16, 2010, the entire contents of which are incorporated by reference herein.

INDUSTRIAL APPLICABILITY

The invention is applicable to a network monitoring system and an area design system in a mobile communication network.

REFERENCE SIGNS LIST

5 Measuring radio device
10 Mobile terminal
30 Radio base station

50 Mobile communication core network
70 External network
90 Network monitoring system
95, 100, 200, 3000 Neighbor cell list optimizing system
101 Measurement information memory unit
102 Design information memory unit
103 Measurement information collecting unit
104 Priority calculating unit
105 Neighbor cell list updating unit
106 Reliability evaluating unit
160 Car
1001 First mobile terminal group
1011 First measurement information transmitting means
1002 Second mobile terminal group
1012 Second measurement information transmitting means
2001 First base station
2002 Second base station
3001 Measurement information collecting means
3002 Reliability evaluating means
3003 Priority calculating means
3004 Neighbor cell list updating means

The invention claimed is:

1. A wireless communication system comprising:
a first mobile terminal group;
a first base station which manages a first cell in which the first mobile terminal group exists;
a second mobile terminal group which exists in a second cell which is neighboring to the first cell;
a second base station which manages the second cell; and
a neighbor cell list optimizing system which manages a neighbor cell list in which a specific neighbor cell which is a handover destination candidate of the first mobile terminal group is registered, wherein:
the first mobile terminal group comprises a first measurement information transmitting unit which measures radio quality of the second cell, and transmits measurement information of the second cell to the first base station;
the second mobile terminal group comprises a second measurement information transmitting unit which measures radio quality of the first cell, and transmits measurement information of the first cell to the second base station; and
the neighbor cell list optimizing system comprises:
a measurement information collecting unit which collects the measurement information of the second cell from the first base station, and collects the measurement information of the first cell from the second base station;
a reliability evaluating unit which performs processing of evaluating reliability of the measurement information of the second cell;
a priority calculating unit which, when the reliability is a predetermined threshold or less, calculates a priority for registering the second cell in the neighbor cell list of the first cell based on the measurement information of the first cell; and
a neighbor cell list updating unit which performs control of determining a neighbor cell to register in the neighbor cell list, based on the priority calculated by the priority calculating unit, and updating the neighbor cell list.

2. The wireless communication system according to claim 1, wherein the reliability evaluating unit performs processing of counting a number of pieces of received measurement information of the second cell in a predetermined counting period, and evaluating the reliability of the measurement information of the second cell based on the counted number of pieces of received measurement information.

3. The wireless communication system according to claim 1, wherein, when the reliability is a predetermined threshold or less, the priority calculating unit counts a number of pieces of received measurement information of the first cell in a predetermined counting period, and calculates the priority of the second cell based on the counted number of pieces of received measurement information.

4. The wireless communication system according to claim 3, wherein, when the reliability is the predetermined threshold or less, the priority calculating unit calculates a weighted average of a first priority calculated based on the number of pieces of received measurement information of the first cell and a second priority calculated based on the counted number of pieces of received measurement information obtained by counting the number of pieces of received measurement information of the second cell in a predetermined counting period, and calculates the priority of the second cell based on the weighted average value of the second priority.

5. The wireless communication system according to claim 4, wherein the priority calculating unit determines a weight coefficient of the weighted average based on the reliability of the measurement information of the second cell.

6. The wireless communication system according to claim 4, wherein the priority calculating unit determines a weight coefficient of the weighted average based on a time passed after the first cell is set.

7. A neighbor cell list optimizing system which updates a neighbor cell list which is set to a first base station which manages a first cell in which a first mobile terminal group exists, and in which a specific neighbor cell which is a handover destination candidate of the first mobile terminal group among second cells which are neighbor to the first cell and in which second mobile terminal groups exist is registered, the neighbor cell list optimizing system comprising:
a measurement information collecting unit which collects measurement information of radio quality of the second cells which is transmitted from the first mobile terminal group to the first base station, and measurement information of radio quality of the first cell which is transmitted from the second mobile terminal groups which exist in the second cells to second base stations which manage the second cells;
a reliability evaluating unit which performs processing of evaluating reliability of the measurement information of the second cells;
a priority calculating unit which, when the reliability is a predetermined threshold or less, calculates a priority for registering the second cells in the neighbor cell list of the first cell based on the measurement information of the first cell; and
a neighbor cell list updating unit which performs control of determining a neighbor cell to register in the neighbor cell list, based on the priority calculated by the priority calculating unit, and updating the neighbor cell list.

8. A first base station which manages a first cell in which a first mobile terminal group exists, and which updates a neighbor cell list which is set to the first base station and in which a specific neighbor cell which is a handover destination candidate of the first mobile terminal group is registered, the first base station comprising:
a measurement information collecting unit which is connected to a second base station which manages a second cell which is neighboring to the first cell and in which a second mobile terminal group exists, and which collects measurement information of radio quality of the second cell which is transmitted from the first mobile terminal group to the first base station, and measurement information of radio quality of the first cell which is transmitted from the second mobile terminal group to the second base station;

a reliability evaluating unit which performs processing of evaluating reliability of the measurement information of the second cell;

a priority calculating unit which, when the reliability is a predetermined threshold or less, calculates a priority for registering the second cell in the neighbor cell list of the first cell based on the measurement information of the first cell; and a neighbor cell list updating unit which performs control of determining a neighbor cell to register in the neighbor cell list, based on the priority calculated by the priority calculating unit, and updating the neighbor cell list.

* * * * *